June 4, 1968 G. T. URWIN 3,386,652

APPARATUS FOR PRODUCTION OF PUNCHED RECORD CARDS

Filed Jan. 26, 1965 7 Sheets-Sheet 1

Inventor
George Thomas Urwin
by Albert Jacobs
Attorney

Inventor
George Thomas Urwin
by Albert Jacobs
attorney

June 4, 1968 G. T. URWIN 3,386,652

APPARATUS FOR PRODUCTION OF PUNCHED RECORD CARDS

Filed Jan. 26, 1965 7 Sheets-Sheet 3

Inventor
George Thomas Urwin
by Albert L. Jacobs
Attorney

Inventor
George Thomas Urwin
by Albert L. Jacobs
Attorney

June 4, 1968 G. T. URWIN 3,386,652

APPARATUS FOR PRODUCTION OF PUNCHED RECORD CARDS

Filed Jan. 26, 1965 7 Sheets-Sheet 5

Inventor
George Thomas Urwin
By Albert E. Jacobs
Attorney

June 4, 1968 G. T. URWIN 3,386,652

APPARATUS FOR PRODUCTION OF PUNCHED RECORD CARDS

Filed Jan. 26, 1965 7 Sheets-Sheet 6

Inventor
George Thomas Urwin
by [signature]
Attorney

June 4, 1968 G. T. URWIN 3,386,652

APPARATUS FOR PRODUCTION OF PUNCHED RECORD CARDS

Filed Jan. 26, 1965 7 Sheets-Sheet 7

Inventor
George Thomas Urwin
by Albert [illegible]
Attorney

United States Patent Office 3,386,652

Patented June 4, 1968

3,386,652

APPARATUS FOR PRODUCTION OF PUNCHED RECORD CARDS

George Thomas Urwin, Durham, England, assignor to The Sunderland Forge & Engineering Company Limited, Durham, England, a company of Great Britain and Northern Ireland Filed Jan. 26, 1965, Ser. No. 428,066
14 Claims. (Cl. 235—60.29)

ABSTRACT OF THE DISCLOSURE

A card punching apparatus useful for punching cards with a record of an additive process is constructed of a plurality of linearly displaceable actuators, a plurality of punch elements which extend laterally to the direction of displacement of the actuators so as to be selectively engageable by the actuators, a cumulative counting mechanism which comprises a plurality of rotary elements which represent different digits of a count and each of which is associated with one of the actuators for the purpose of displacing the actuators, rotary input means which drive the rotary elements in relation to the additive process which is being recorded, a die plate which is opposed to the punch elements, guide means on the plate to support and locate the card which will be punched with the information and means adapted to effect relative displacement of the punched elements and the die plate in a direction transverse to the direction of linear displacement of the actuators.

This invention has for an object to provide apparatus whereby a card may be punched with a record of an additive process which is capable of being registered by metering means. As examples of such additive processes reference may be made to (a) Consumption of public utility supplies such as electricity, gas and water, registered by meter;

(b) Time recording, whether for work people or working operations, registered by clock;

(c) Coin-operated systems, wherein the value of coins inserted is registered by electrical means associated with coin-actuated switches;

(d) Coin counting systems, provided with means for registering the value of a batch of coins counted.

The invention is particularly concerned with card punching apparatus comprising a plurality of linearly displaceable actuators, a plurality of punch elements extending laterally to the direction of displacement of said actuators to be selectively engageable by said actuators, a cumulative counting mechanism comprising a plurality of rotary elements representing different digits of a count and each associated with one of said actuators to displace said actuators, rotary input means driving said rotary elements in relation to the process being registered, a die plate opposed to said punch elements, guide means on said plate to support and locate a card to be punched and means adapted to effect relative displacement of said punched elements and die plate in a direction transverse to the direction of linear displacement of said actuators.

When the additive process to be recorded is decimal, as for example in connection with an electricity or gas meter, a unit rotary element may be associated with a ratchet wheel having ten teeth, and actuatable by or from the meter, each of the other rotary elements being actuable stepwise in succession by transmission means affording successive 1/10 ratios.

In the case of a timing process, there may be four rotary means, the first of which is associated with a ratchet wheel having ten teeth and actuated by or from a clock, and the second of which has six teeth and is driven by suitable transmission means, so as to record up to 59 minutes and then revert to 00. A third rotary means may be driven from said second means by transmission means with a ratio of 1/12 so as to count 0–9 and 0, 1 in alternation, or with a ratio of 1/24 so as to count 0–9, 0–9, 0–3 cyclically, while a fourth rotary means is driven stepwise to count respectively 0, 1 or 0, 1, 2, repeatedly, according to whether the time-counting is by 12-hour or 24-hour periods.

For use with non-decimal coin-counting apparatus, the number of ratchet wheels may be such as to allow for the values of the coins to be counted. Thus a unit for counting British pennies may have a ratchet wheel with 12 teeth associated with two rotary means such as to displace two actuators in a manner to record numbers from 01–12 and then revert to 00; such wheel may be associated with electromagnetic control means whereby the ratchet wheel is displaceable by one tooth to count a single penny, or by three or six teeth to count a threepenny or sixpenny piece. Another pair of rotary means in addition to being driven by cyclometer means so as to count shillings from 01–20 and then revert to 00, may have an over-riding, electro-magnetically controlled, ratchet means for direct actuation by the passage of shillings or florins, and also jointly with the electromagnetic control of the unit wheel for actuation by half-crowns. Finally, a series of ten-tooth ratchet wheels actuated by transmission means may be provided for decimal counting of British pounds.

The aforesaid rotary means may be spiral cams, the actuators being linearly displaceable cam followers, or alternatively being linearly displaceable by pivotally mounted cam followers. Since the stepwise angular displacement of any cam may be small in relation to the required linear displacement of the actuator for example, a lever with unequal arms may be interposed between the cam profile and said actuator. In such arrangement, and when the additive process is effected by more than one solenoid, the cams may be displaceable some about one and some about another of two or more parallel axes, as an alternative to an arrangement wherein all the cams are coaxially disposed.

In an alternative arrangement, the actuators may have rack-toothed portions, and be linearly displaceable by rotary means comprising pinions in mesh with the rack teeth and rotatable by the aforesaid ratchet wheel or wheels and transmission means.

Apparatus as above referred to may be housed in a casing providing supporting means whereon said die plate is slidable towards and away from the punch elements, and housing means whereby the sliding displacement of said plate is effected, for example, manually upon operation of an external lever. The die plate may have in its face a plurality of linear series of recesses spaced to correspond with the several displacements of the actuators when each of these carries a laterally projecting punch element, or with the several punch elements in each series located to be selected one at a time by an associated actuator, and also have means whereby a card to be punched is locatable upon said face. The casing may have a slot through which a card is insertable to engage the locating means on said die plate.

The apparatus may also comprise means, adjacent said variably controllable punch elements, enabling the selective location of fixed punch elements, so as to form in each punched card a code indication of permanently relevant factors, such as an account number and information pertinent thereto, thereby to identify the particular apparatus in which the card has been punched.

The ratchet wheel or wheels may be actuable by electromagnetic means suitably controlled by apparatus which registers the passage of units or other terms to be counted.

Embodiments of the invention, adapted for decimal counting, for example, in association with an electric meter, will be briefly described with reference to the accompanying drawings, wherein:—

Figure 1:
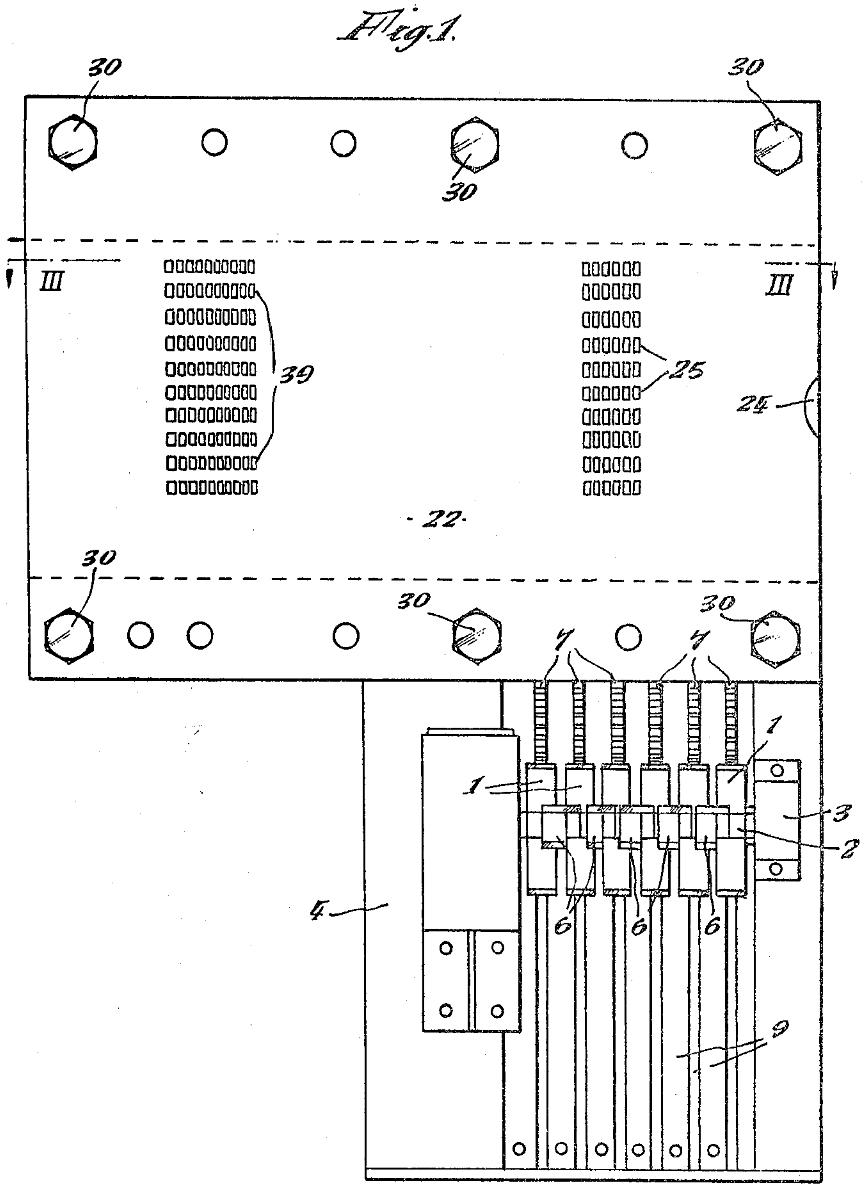
FIG. 1 is a face view of one embodiment of the apparatus, with cover removed.
Figure 2:
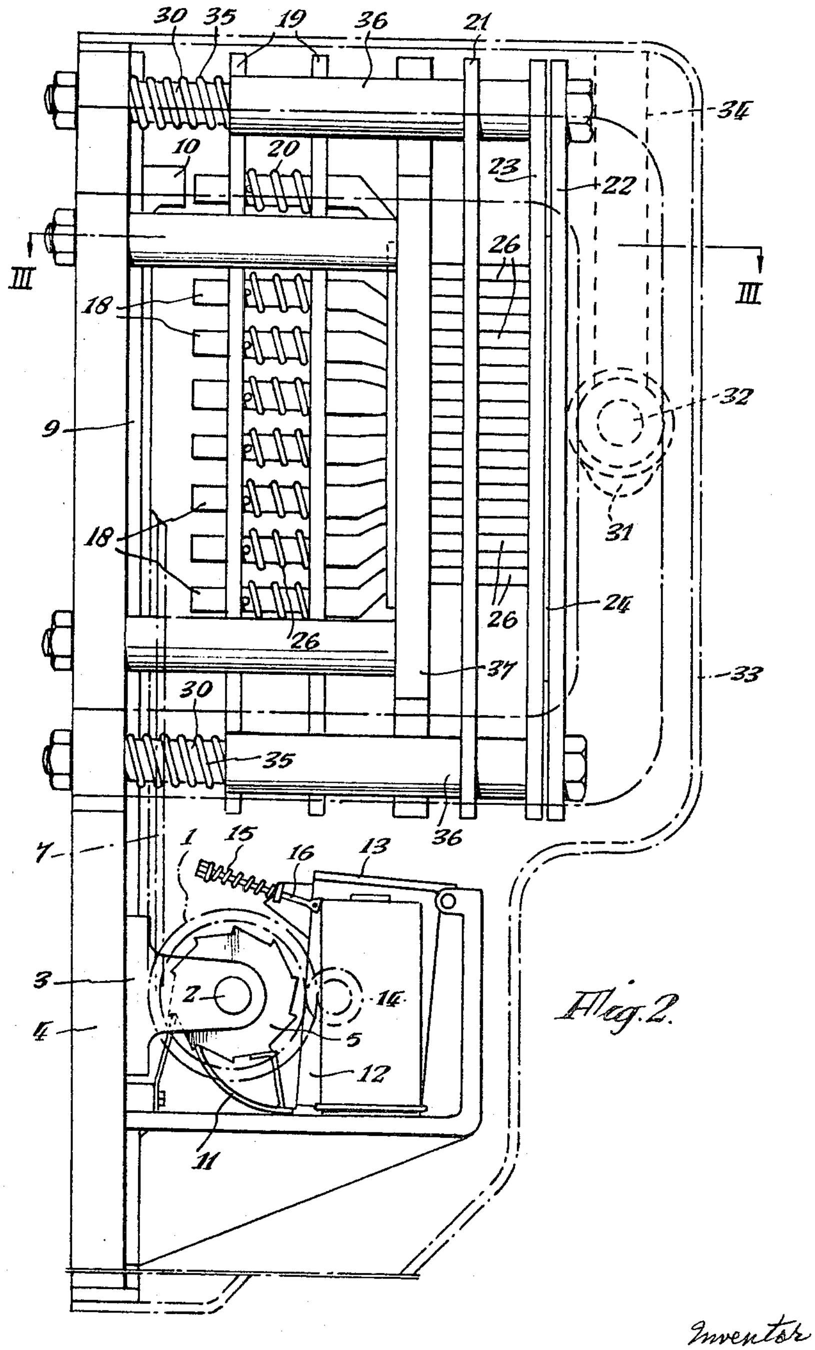
FIG. 2 is a side elevation of the same.
Figure 3:
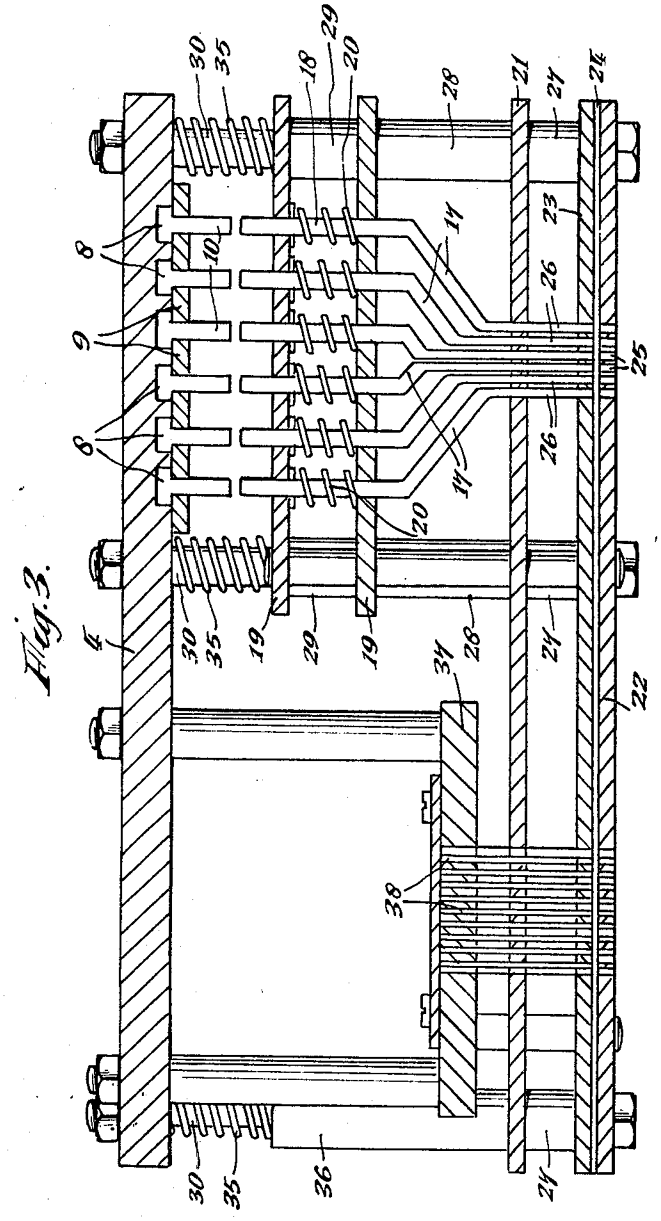
FIG. 3 is a horizontal section on the line III—III of FIG. 2.
Figure 4:
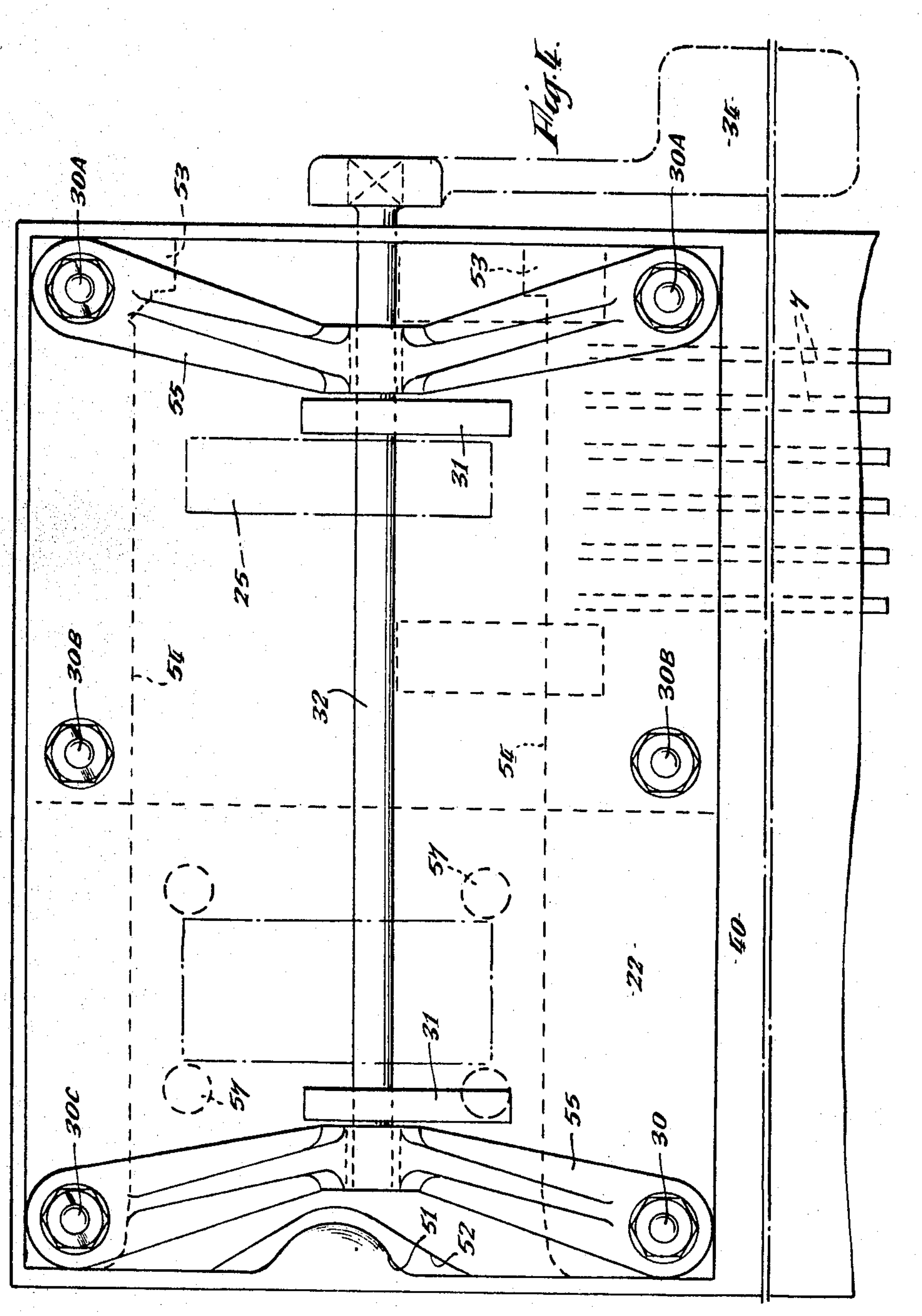
FIG. 4 is a face view of another embodiment, with cover removed.
Figure 5:
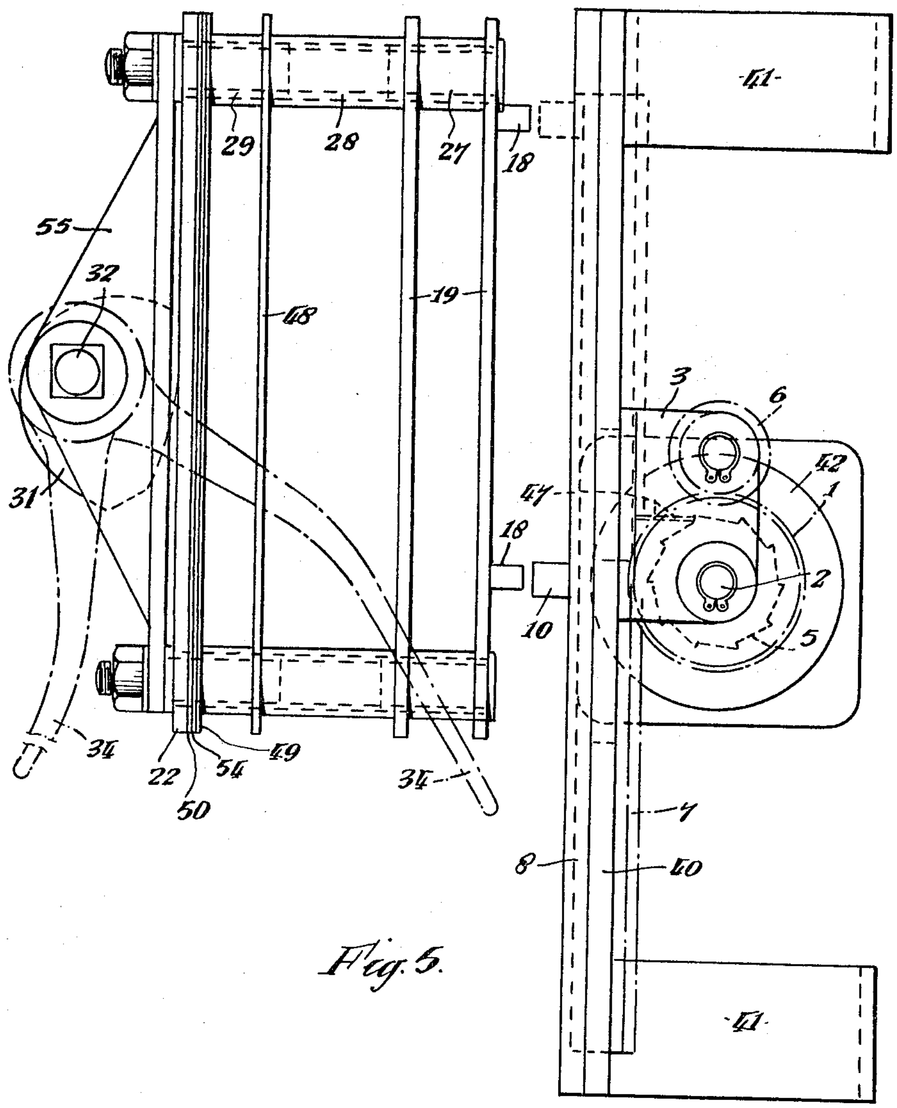
FIG. 5 is a side elevation.
Figure 6:
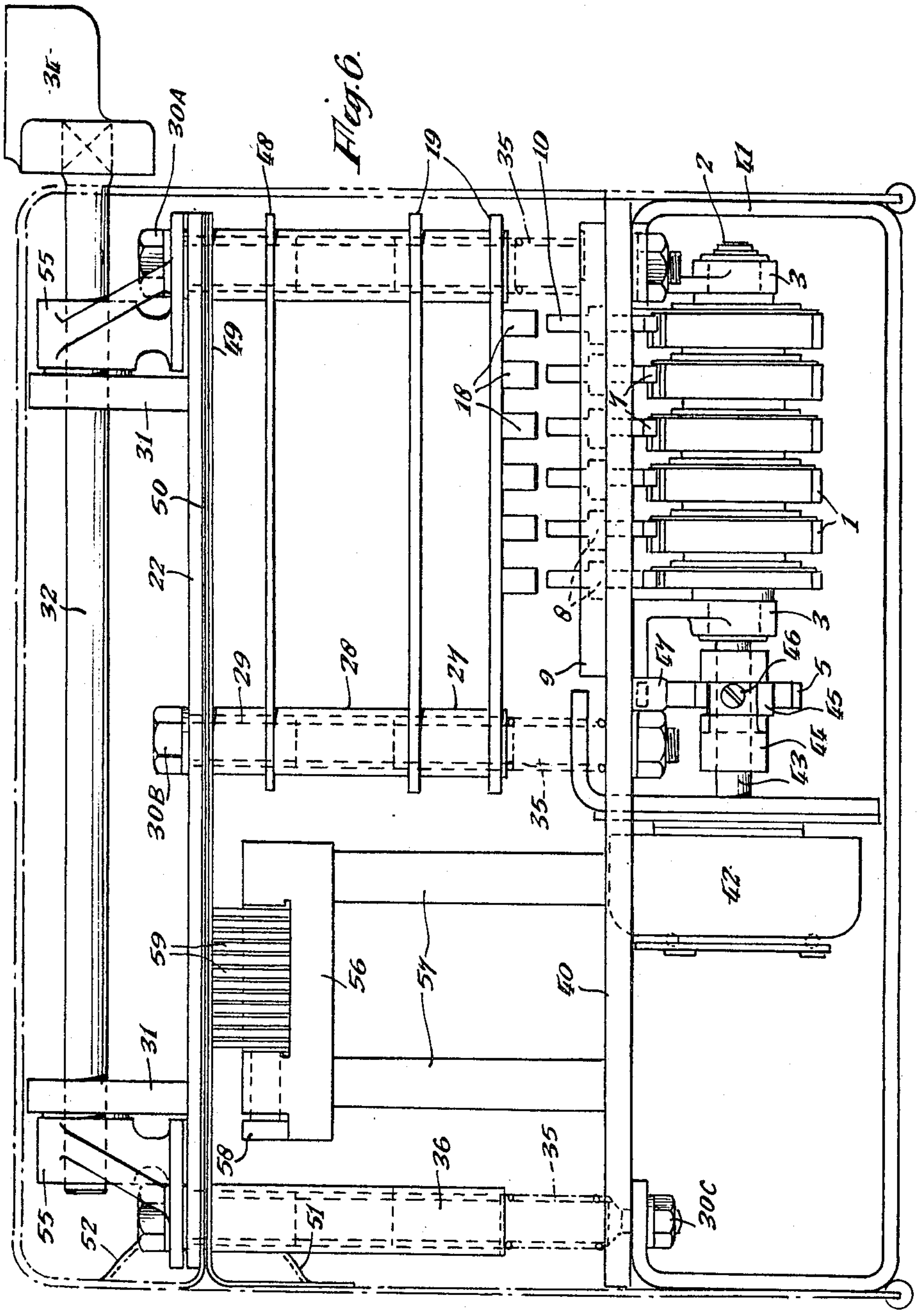
FIG. 6 is a view from below of the same.
Figure 7:
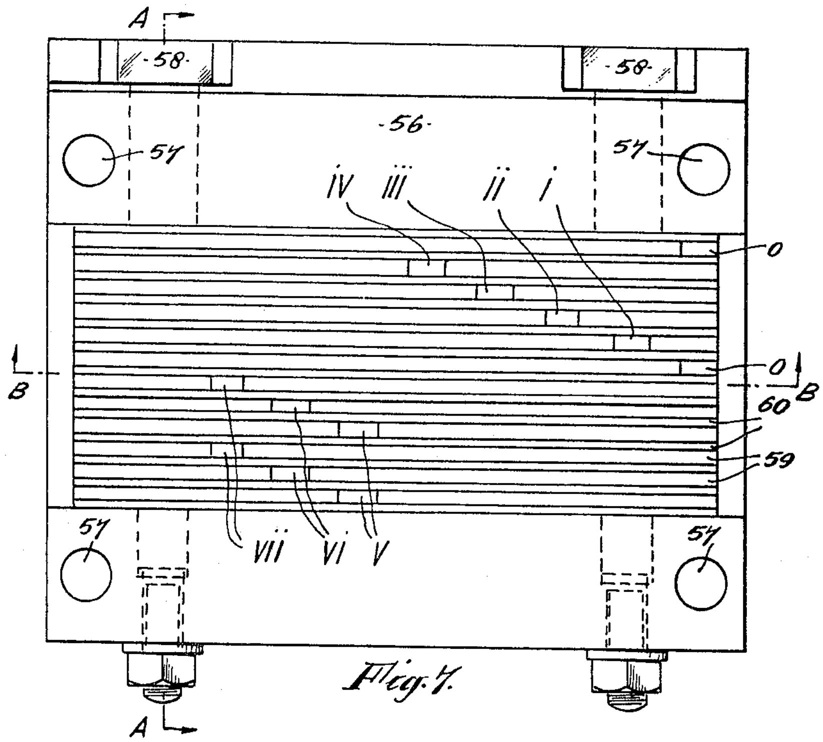
FIG. 7 is a face view of a fixed punch frame.
Figure 8:
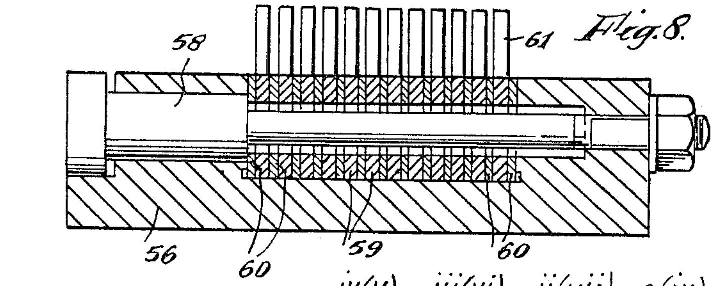
FIGS. 8 and 9 are respectively sections on the lines A—A and B—B of FIG. 7.

The apparatus as shown in FIGS. 1–3 of the drawings comprises six gear wheels 1 rotatable on a common spindle 2, which is supported upon two pedestals 3 from a base member 4. One of the wheels 1 which will be called the "unit wheel," is also secured to be rotatable with a ten-tooth ratchet wheel 5. The several gear wheels 1 are interconnected by step-wise transmission means indicated at 6, whereby when said unit wheel has rotated through 360°, the next adjacent gear wheel is turned through 36°, and so on throughout the series to perform decimal counting up to 999,999 and then go on to zero. Each of the wheels 1 has a gapped external ring of teeth in mesh with a rack-toothed portion 7 of one of six actuators 8 arranged to be vertically displaceable in guide means 9, and carrying a lateral projection 10, the gap in said tooth ring being located so that after the projection 10 has been raised to its uppermost position as shown in FIG. 2, the next angular displacement of the wheel permits the actuator 8 to descend so that the projection 10 is opposed to the lowermost of the punch shanks 18 in the associated series.

The ratchet wheel 5 is displaceable through successive steps of 36° each, by a pawl 11 (FIG. 2), mounted on the lower end of a radius plate 12, integral with an armature 13 of a solenoid 14, which is actuable by a transistor amplifier coupled to the unit wheel of an electric meter (or other suitable pulsing means arranged to energise the solenoid each time consumption of one electrical unit is indicated by the meter). The armature 13 is also borne upon by a spring 15 through a link 16, the arrangement being such that attraction of the armature merely pulls the pawl 11 over one tooth of the ratchet wheel 5, and angular displacement of said ratchet wheel with the associated unit wheel 1 is performed by the spring 15.

The wheels 1 and racks 7 are such that each angular displacement of a wheel by 36° raises the associated actuator 8 by suitable, equal vertical displacements. Opposed to each of the projections 10 is a series of ten cranked punch elements 17, the shank portions 18 of which are guided in apertures in a pair of spaced parallel plates 19, with retraction springs 20 between said plates, and the nose portions of which are guided in slots in a plate 21. Congruent and parallel with said plate 21 is a die plate 22, with a backing plate 23 slightly spaced therefrom to enable the lateral insertion between said plates of a card 24 to be punched. The die plate 22 has six vertical series each of ten slots 25 and the plate 23 has a like group of slots wherein the noses 26 of the punch elements are located so as to be in register with said slots 25. The assembly of plates 19, 21, 22 and 23 is mounted with the aid of spacers 27, 28 and 29, to be slidable upon six rods 30 mounted in the base 4 perpendicular to said base. The die plate 22 is engaged by a cam 31 on a spindle 32 which projects from one side wall of a cover 33 and carries an external operating lever 34. The die plate 22 is pressed upon the cam 31 by six springs 35 located upon the rods 30. The right hand four of said springs 35 bear between the base 4 and the rearward one of the plates 19, while the left hand pair of springs bear between said base and spacers 36 on the left hand pair of the rods 30. The whole apparatus is enclosed by the cover 33 secured to the periphery of the base 4, which cover may be locked or sealed in position by conventional means.

The apparatus is arranged so that at each counting stage each of the projections 10 is in register with one of the ten punch shanks 18 in the series located in the vertical plane in which the actuator carrying said projection is guided. The plate 22 is normally located apart from the punch noses 26 so that there is space for the insertion of a card 24 between the plates 22 and 23. Thereafter, when the lever 34 is pulled downwards, by means of the cam 31 the plates are moved inwards on the rods 30, and thereby the card is punched, by those noses 26 whose shanks back up against the projections 10, with a record of the number of units (up to 999,999) registered by the counting apparatus. The lever 34 may then be raised, permitting withdrawal of the plates 22, 23 and the card therebetween, which with its punched record may be extracted laterally from the casing.

The apparatus may also comprise a fixed frame 37, as shown in FIGS. 2 and 3, having a suitable number of vertical series each of ten slots 38 in which punch elements may be selectively located to extend, like the punch noses 26, towards registering slots 39 in the die plate 22, and backing plate 23, so as to form in each punched card a code indication of permanently relevant factors.

The backing plate 23, with perforations in register with the slots in the die plate 22, not only locates the punch noses in register with said slots, but also serves to ensure total withdrawal of the card 24 from the punch noses after a punching operation.

The apparatus as described may evidently be adapted for use with a gas or water meter or other device which performs decimal counting, of a succession of like units, by the provision of suitable means for pulsing the solenoid 14 upon the passage of each unit.

In the embodiment shown in FIGS. 4–9, (wherein parts equivalent to those shown in FIGS. 1–3 have the same reference numerals) the principal modification is that the operating mechanism is displaced from a position beneath the punch mechanism to a position at the rear of a modified base plate 40, having two brackets 41 whereby the apparatus is spaced from a mounting surface. An angularly displaceable electrical pulsing element 42 is connected by a spindle 43 with a mounting 44 to which a pawl 45 is secured by a screw 46. Said element 42 and the pawl 45 have an angular displacement (and return) of 45° to displace with some lost motion the ratchet wheel 5 by 36° or one tooth, and said ratchet wheel is also engaged by a non-return spring blade 47.

The rack portions 7 of the actuators 8 project rearwardly through slots in the base plate 40 to be engaged by the gear wheels 1, above which are mounted the cyclometer means 6. The projections 10 on the actuators 8 protrude through slots in a guide plate 9 so that according to their individual degrees of elevation they selectively engage shanks 18 of a plurality of punch elements arranged as shown in FIGS. 2 and 3. The punch noses are grouped within the rectangular area 25 (FIG. 4) and are guided by a guide plate 48 and a backing plate 49 towards the die plate 22 which has a face plate 50. Said plates 49 and 50 have at their left hand sides recesses 51 and 52 to facilitate the insertion and retraction from between them of a card to be punched, the insertion being limited by stops 53 on spacing strips 54.

The assembly of the die plate 22, together with the face plate 50, the plates 19, 48 and 49 and the punch elements mounted therein, are slidably displaceable on three pairs of bolts 30A, 30B and 30C, and are resiliently held away from the base plate 40 and actuators 8 mounted thereon, by springs 35. The cam shaft 32 is mounted in two brackets 55 secured to the forward ends of the pairs of bolts 30A and 30C and is provided with two cams 31 whereby on operation of a lever 34 said assembly is displaceable towards te base plate for the punching of a card by those of the punch elements which have their shanks 18 opposed by projections 10 on the actuators 8.

Figure 9:
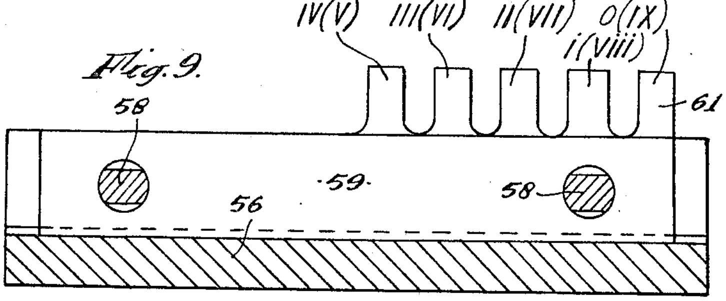

FIGURES 6–9 also show a modified arrangement of fixed punch means for forming in each punched card a code indication of permanent factors. This comprises a punch support member 56 rigidly spaced from the base plate 40 by four pillars 57. In the support 56 are mounted by means of two bolts 58 a group of fixed punches 59 as more clearly shown in FIGS. 7–9. As illustrated, the support 56 holds a group of twelve punches in a channel with suitable spacing elements 60, although the number may be varied as desired. Each punch has a projecting nose 61. For decimal purposes there are five different punches with their noses located as shown in FIG. 9, offset from a plane intersecting the elements at the centre of their length. Any punch may be located in the support member with its nose offset to one side or the other of this central plane and each punch can therefore represent either of two units of the decimal series; that is to say, the different punches will serve to record the numbers 0 and 9 (ix), 1 (i) and 8 (viii), 2 (ii) and 7 (vii), 3 (iii) and 6 (vi), and 4 (iv) and 5 (v). As shown for example in FIG. 7 the punches are arranged to record (reading from bottom to top) the series of digits 567567012340, but evidently any required series of up to 12 digits can be recorded by suitable selection and arrangement of the punch elements 59.

In a modification of the apparatus for non-decimal counting, e.g. of assorted coins inserted in a pre-payment telephone call box or other coin-receiving apparatus, each coin slot or passage may have an associated switch that operates suitable relay means to effect the required angular displacement of the gear wheels 1. Thus, a unit wheel 1 for counting British pennies may be rotatable jointly with a 12-step ratchet wheel, for displacing its associated actuator by 12 equal steps 0–12, then allowing the actuator to descend to the 0 position. The ratchet wheel may be displaceable by a solenoid 14 in the manner described, said solenoid being controlled so as to be pulsed once by a penny-actuated switch and three times or six times by switches actauted respectively by threepenny or sixpenny pieces.

Associated with such penny counting means, a shilling counter may comprise a pair of the wheels 1, the first of which is driven by step-wise transmission means from said unit wheel with a 1/10 ratio so that it is displaced by 36° for each complete revolution of said unit wheel, and is also provided with an over-riding 10-tooth ratchet wheel drive operated by another solenoid which is pulsed once or twice under the control respectively of switches actuated by shillings or florins respectively; said solenoid may also be pulsed twice while the solenoid operating the penny-counter ratchet is pulsed six times by a switch that is actuated by half-crowns. The second wheel of this pair may be driven by transmission means from the first wheel, so as to hold its actuator in the 0 position and the 1 position during alternate revolutions of the first wheel. The remainder of this apparatus, for counting British pounds, comprises a suitable series of wheels driven by a succession of step-wise transmission means with 1/10 ratios from said second wheel of the shillings counter.

I claim:

1. Apparatus for punching a card with a record of an additive process, comprising a plurality of linearly displaceable actuators, a plurality of series of laterally extending punch elements slidable linearly in a direction perpendicular to the direction of displacement of the actuators, the elements of each series having shanks in alignment with one of the actuators, a plurality of rotary means each associated with one of the actuators whereby said actuators are displaceable, each actuator having a lateral projection engageable with one of the shanks selectively in accordance with the position of displacement of the actuator by its rotary means, mechanism whereby each of said rotary means is rotatable step-wise, said mechanism comprising means actuating in relation to the process being registered at least one ratchet wheel associated with one of said rotary means and transmission means between the respective rotary means whereby the other rotary means are turned progressively under the actuation of said one rotary means by said ratchet wheel, a die plate opposed to said punch elements, guide means on said plate to support and locate a card to be punched, said guide means and die plate being assembled together for unitary displacement towards and away from said actuators, the assembly including resilient means to bias the punch elements for displacement with said guide means, the punching of a card being effected by selected punch elements which are prevented from displacement with said guide means by opposition of their shanks to the lateral projections on the actuators.

2. Apparatus according to claim 1, further comprising a plurality of parallel rods upon which said assembly of guide means and die plate is displaceable, resilient means biasing the assembly away from the actuators, cam means for displacing the assembly, bearings for said cam means fixedly supported upon at least some of said rods, and an external operating lever for said cam means.

3. Apparatus for punching a card with a record of an additive process comprising a plurality of actuators, a base member upon which said actuators are linearly displaceable, a plurality of groups of laterally extending punch elements each group being associated with a respective actuator and the elements of each group having shanks in alignment with its actuator, each actuator having a lateral projection engageable with one of said shanks selectively in accordance with the position of displacement of the actuator, a cumulative counting mechanism comprising a plurality of rotary means rotatable step by step in relation to the process being registered each rotary means being drivingly associated with a respective actuator, a die plate opposed to said punch elements and having in its face a plurality of linear series of recesses to accommodate noses of the punch elements in any operative combination thereof selected by the displacement of the actuators, guide means to support and locate a card to be punched, said guide means comprising a pair of spaced guide plates having apertures in which said punch elements are slidably housed, a plurality of parallel rods at right angles to said base member whereon said die plate and said guide plates are slidable, spacer means slidable on said rods to maintain said plates in parallel relationship, resilient means between the base member and that guide plate nearer the base member to bias said die and guide plates away from said base member, and resilient means to bias the punch elements for displacement with said guide means, the punching of a card being effected by selected punch elements which are prevented from displacement with said guide means by opposition of their shanks to the lateral projections on the actuators.

4. Apparatus according to claim 3, further comprising bearings fixedly supported upon the ends remote from said base member of at least some of said parallel rods, a cam shaft mounted in said bearings, cam means secured on said shaft and engaging said die plate, and an operating lever secured to said shaft.

5. Apparatus according to claim 3, further comprising a backing plate secured to said die plate and having apertures corresponding to the recesses in the die plate to accommodate the punch noses, and spacing means between said die and backing plates to accommodate and locate a card to be punched, said backing plate serving to withdraw a card from said punch noses after punching thereof.

6. Apparatus according to claim 3, further comprising at least one pillar projecting at right angles from said base member within said plurality of parallel rods, mounting means fixed upon said pillar, and fixed punch elements mounted and selectively located in said mounting means to form in each card punched a code indication of permanent factors.

7. Apparatus for punching a card with a record of an additive process, comprising a plurality of linearly displaceable actuators, a plurality of series of laterally extending punch elements slidable linearly in a direction perpendicular to the direction of displacement of the actuators, the elements of each series having shanks in alignment with one of the actuators, a plurality of rotary means each associated with one of the actuators whereby said actuators are displaceable, each actuator having a lateral projection selectively engageable with one of the shanks of its series of punch elements in accordance with the position of displacement of the actuator by its rotary means, mechanism whereby each of said rotary means is rotatable stepwise, said mechanism comprising a drive input member actuated in relation to the process being registered and associated with one of said rotary means and cumulative transfer means whereby the other rotary means are turned progressively by said drive input member, a die plate opposed to said punch elements, guide means on said plate to support and locate a card to be punched, a backing plate secured to said die plate, said die and backing plates having corresponding apertures to accommodate the punch elements and spacing means being provided between said die and backing plates to afford a space to accommodate and locate a card to be punched, said guide means and die and backing plates being assembled together for unitary displacement towards and away from said actuators, the assembly including resilient means to bias the punch elements for displacement with said guide means, the punching of a card being effected by selected punch elements which are prevented from displacement with said guide means by said engagement of their shanks with the lateral projections of the actuators, said backing plate serving to withdraw a card from the punch elements after punching thereof.

8. Apparatus for punching a card with a record of an additive process comprising a plurality of linearly displaceable actuators, a plurality of punch elements extending laterally to the direction of displacement of said actuators to be selectively engageable by said actuators, a cumulative counting mechanism comprising a plurality of rotary elements representing different digits of a count and each associated with one of said actuators to displace said actuators, rotary input means driving said rotary elements in relation to the process being registered, a die plate opposed to said punch elements, guide means on said plate to support and locate a card to be punched and means adapted to effective relative displacement of said punch elements and die plate in a direction transverse to the direction of linear displacement of said actuators, mounting means fixed adjacent to the punch elements associated with said actuators and fixed punch elements mounted and selectively located in said mounting means to form in each card punched a code indication of permanent factors.

9. Apparatus according to claim 8, further comprising a base member wherein said actuators are guided for linear displacement, at least one pillar projecting from said base member, and said fixed punch mounting rigidly supported upon said pillar.

10. Apparatus according to claim 8, wherein the fixed punch mounting means comprises a channel, said fixed punch elements being laminar, and secured in said channel with laminar spacing elements.

11. Apparatus according to claim 8, wherein the fixed punch elements are plates each with a projecting punch nose, the nose on each plate being provided at one of five equally spaced locations on one half of the plate, and the plate being reversible end-to-end for securing in said mounting means to present said nose at either of two locations equally spaced from a mean plane perpendicular to the plates.

12. Apparatus according to claim 8, further comprising a base member wherein said actuators are guided for linear displacement, said fixed punch mounting means projecting from said base member and presenting a channel open towards the die plate, said fixed puch elements being plates each with a projecting punch nose, the nose on each plate being provided at one of five equally spaced locations on one half of the plate, and the plate being reversible end-to-end for securing in said mounting means to present said nose at either of two locations equally spaced from a mean plane perpendicular to the plates, and laminar spacing elements secured in alternation with said fixed punch plates in said channel.

13. Apparatus according to claim 8, further comprising supporting means whereon the die plate is displaceable towards and away from said actuable and fixed punch elements, the die plate having in its face one plurality of linear series of recesses spaced to accommodate noses of the actuable punch elements in any operative combination thereof selected by the displacements of the actuators, and another plurality of linear series of recesses spaced to accommodate said fixed punch elements.

14. Apparatus for punching a card with a record of an additive process, comprising a plurality of linear groups of punch elements, an actuator associated with each group and rotary means for displacing the actuators, said means comprising a train of rotary elements having actuation means for progessive stepwise rotation to represent said additive process, guide means for each actuator permitting rectilinear displacement of the actuator along the line of its associated group of punch elements, a lateral projection on each actuator being aligned successively with each punch element of its group under the actuation of the associated rotary element, a die plate opposed to said punch elements at their ends remote from said lateral projections, means on said plate to support and locate a card to be punched, resilient means biasing the punch elements towards the die plate and means to displace the die plate toward said punch elements to punch the card with a recording pattern by selected punch elements prevented from displacement against their resilient biasing means by their alignment with said lateral projections.

References Cited

UNITED STATES PATENTS

| | | | |
|---|---|---|---|
| 1,228,315 | 5/1917 | Goss | 346—104 |
| 1,701,436 | 2/1929 | Baker | 235—60.29 |
| 2,148,500 | 2/1939 | Potts | 346—95 |
| 2,206,116 | 7/1940 | Ohmer | 235—60.29 |
| 2,272,448 | 2/1942 | Jon Pein | 235—60.29 |
| 3,029,120 | 4/1962 | Bud | 346—87 |
| 3,084,013 | 4/1963 | Brett | 346—89 |
| 3,195,144 | 7/1965 | Wales | 346—82 |

RICHARD B. WILKINSON, *Primary Examiner.*

S. A. WAL, *Assistant Examiner.*